Feb. 28, 1928.

A. E. FLEMING 1,660,329

HOLDER FOR GOLF CLUB SHAFTS AND THE LIKE

Filed April 14, 1924

Albert Edgar Fleming
by C. P. Goepel
Attorney

Patented Feb. 28, 1928.

1,660,329

UNITED STATES PATENT OFFICE.

ALBERT EDGAR FLEMING, OF RICHMOND, ENGLAND, ASSIGNOR OF ONE-THIRD TO HENRY THOMAS LEMAN FRESHWATER, OF HAMPTON, MIDDLESEX, ENGLAND.

HOLDER FOR GOLF-CLUB SHAFTS AND THE LIKE.

Application filed April 14, 1924, Serial No. 706,264, and in Great Britain January 8, 1924.

This invention relates to a clamping device primarily intended for securing shafted articles such as golf clubs rigidly in position for cleaning or other operations.

The device according to the present invention comprises a pair of jaws hinged together and provided with convenient means for locking them in the closed position, each said jaw being provided with a groove lined with rubber, felt or other yielding material, and means to secure the said jaws to any convenient fixed support.

The said jaws are preferably of fair length, say about three or four inches so as to provide a good bearing surface for the shaft of the golf club or the like which is placed in the lined grooves and the jaws then securely locked together by any convenient means such as screw pivoted to one jaw and carrying a wing nut for engagement with lugs or projections on the other jaw.

The present invention is illustrated in the accompanying drawings.

In all of these figures, A and B designate gripping jaws hinged together at C and provided respectively with semi-circular grooves $A^1$ and $B^1$ lined with suitable yielding material D. The jaw B carries a threaded pin E pivoted between studs F and provided with a wing nut G arranged to be screwed down against spaced lugs H on the jaw A to lock the said jaws together.

Figure 1:
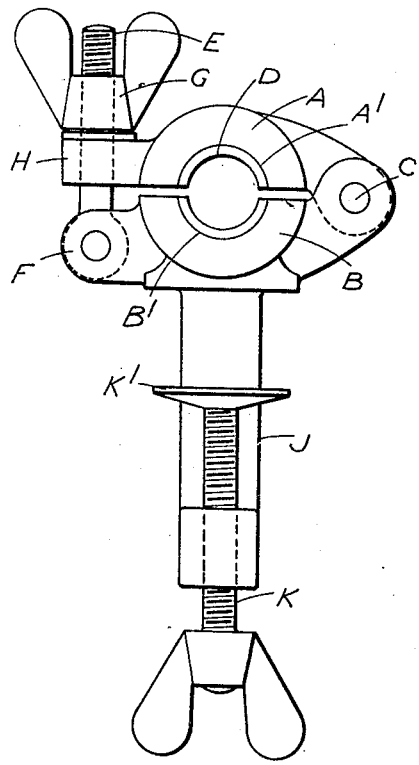
Fig. 1 is an end view in elevation of one construction of my improved clamping device.
Figure 2:
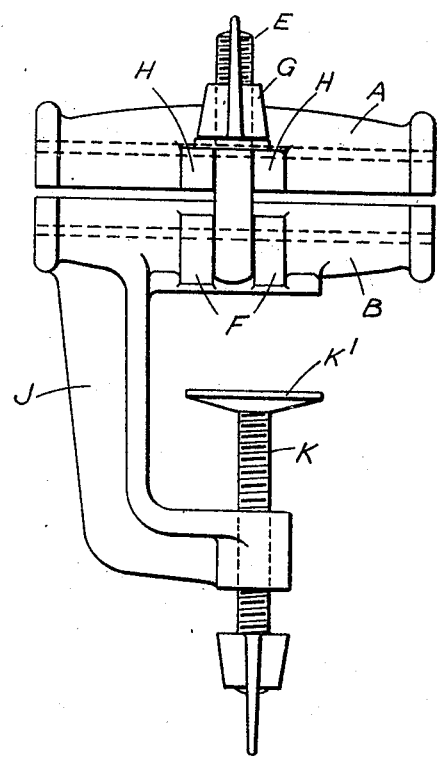
Fig. 2 is a side view of Fig. 1.

As illustrated in Figs. 1 and 2 a depending L-shaped bracket J preferably cast integral with the jaw B terminates in a threaded collar in which the pinching screw K works to serve as a clamp for securing the device to a bench or table or other convenient fixed support which is gripped between the piece $K^1$ and the under-surface of the jaw B.

Figure 3:
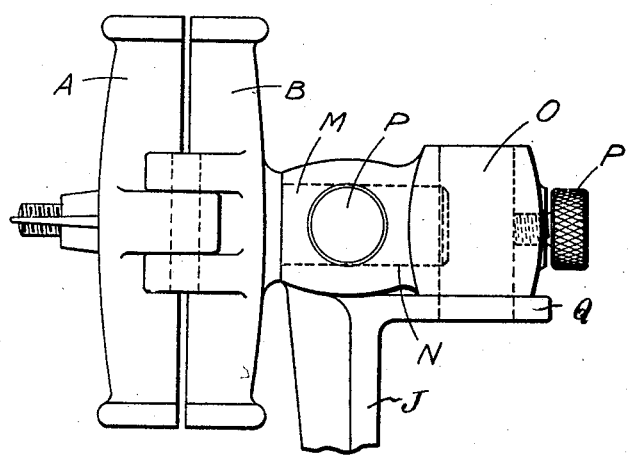
Fig. 3 is a view in elevation (partly broken away) of a modified embodiment adapted for adjustment of the gripping jaws to different positions.

In the construction shown in Fig. 3 the jaw B carries a pin M fitting in either of the recesses or sockets N and O in a base member Q and secured by locking screws P. This base member Q is provided with a depending L-shaped bracket J, having a threaded collar for receiving a pinching screw, the same as that illustrated in Figs. 1 and 2. In this form of the device the gripping jaws are adjustable in various planes for convenience of presenting the golf club head or other work-piece. It will be noted that when the gripping jaws are supported in the socket M that they are adapted to swing in a vertical plane and when supported in socket O, they will swing in a horizontal plane, in each instance the jaws may be locked in a desired position by turning either one or other of the screws P. This device shown in Fig. 3 is fixed in position by the same means as those shown in Figs. 1 and 2.

The whole device with the exception of the linings D is preferably made of metal, for example, the jaws A and B and parts formed integral therewith may be aluminium castings.

What I claim is:—

A clamping device for rigidly securing a shafted article such as a golf club for cleaning or other operation comprising the combination of a pair of extended hinged jaws each provided with a longitudinal groove lined with a yielding material, a threaded bolt pivoted to one of said jaws substantially midway of its length, a pair of lugs on the other jaw to receive said bolt, a nut on the bolt to cooperate with said lugs to lock the jaws together in closed position, an L-shaped bracket formed integrally with one of said jaws towards one end thereof, with the base of the L extending parallel to the jaws, a flat centrally located on the underside of one jaw, and a pinching screw working through said bracket and co-operating with the flat to clamp the device by substantially its center to a fixed support.

ALBERT EDGAR FLEMING.